United States Patent
Hull et al.

(10) Patent No.: US 11,601,198 B2
(45) Date of Patent: Mar. 7, 2023

(54) COCKPIT AND CABIN LIFI POWER AND DATA

(71) Applicant: Bell Textron Inc., Fort Worth, TX (US)

(72) Inventors: Michael Hull, Fort Worth, TX (US); Glenn Sahagun, Irving, TX (US); Daniel Donley, Bedford, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/454,854

(22) Filed: Nov. 15, 2021

(65) Prior Publication Data

US 2022/0069907 A1 Mar. 3, 2022

Related U.S. Application Data

(63) Continuation of application No. 16/557,604, filed on Aug. 30, 2019, now Pat. No. 11,177,880.

(51) Int. Cl.
| | | |
|---|---|---|
| *H04B 10/114* | (2013.01) | |
| *G08B 21/18* | (2006.01) | |
| *H04B 10/66* | (2013.01) | |
| *H04B 10/50* | (2013.01) | |

(52) U.S. Cl.
CPC ......... *H04B 10/1143* (2013.01); *G08B 21/18* (2013.01); *H04B 10/502* (2013.01); *H04B 10/66* (2013.01); *H04B 2210/071* (2013.01)

(58) Field of Classification Search
None
See application file for complete search history.

(56) References Cited

U.S. PATENT DOCUMENTS

| | | |
|---|---|---|
| 6,285,481 B1 | 9/2001 | Palmer |
| 2006/0056855 A1 | 3/2006 | Nakagawa et al. |
| 2008/0310850 A1 | 12/2008 | Pederson et al. |
| 2014/0128021 A1 | 5/2014 | Walker et al. |
| 2017/0036776 A1 | 2/2017 | He |

*Primary Examiner* — Darren E Wolf
(74) *Attorney, Agent, or Firm* — Fogarty LLP

(57) ABSTRACT

Embodiments are directed to systems and methods for utilizing aircraft cockpit and cabin lighting to provide both power and data transmission to occupants. Data and power may be transmitted on non-visible and/or visible spectrums. The visible light may be used independently for aircraft illumination. Data for the cockpit allows for quick upload and download of flight planning and maintenance data to an electronic flight bag. The electronic flight bag may also be able to receive power from cockpit and cabin lighting during flight.

20 Claims, 4 Drawing Sheets

COCKPIT AND CABIN LIFI POWER AND DATA

CROSS-REFERENCE TO RELATED APPLICATION

This is a continuation of, and claims benefit of, U.S. patent application Ser. No. 16/557,604, also entitled "Cockpit and Cabin LiFi Power and Data," filed Aug. 30, 2019, and issued as U.S. Pat. No. 11,177,880, which is hereby incorporated herein by reference in its entirety.

TECHNICAL FIELD

This invention relates generally to electronic systems in aircraft, and more particularly, to using light communication to transmit power and data in an aircraft cockpit or cabin.

BACKGROUND

All aircraft, whether fixed-wing, helicopter, or tiltrotor, have flight instruments that present information about the aircraft's current state or position to aircrew. The type, arrangement, and number of flight instruments vary depending upon the aircraft type and mission. The flight instruments will generally include at least basic pitot-static instruments (e.g., airspeed indicator, altimeter, vertical speed indicator), gyroscopic instruments (e.g., attitude indicator, heading indicator, turn coordinator), and navigation systems. The traditional analog flight instrument configuration has evolved into the modern "glass cockpit" in which the mechanical flight instruments are replaced with digital flight instrument displays. Display panels, such as liquid-crystal display (LCD) or light-emitting diode (LED) panels, are often used to show the information presented by traditional mechanical instruments. The display panels may be, for example, primary flight displays and/or multi-function displays (MFD) that can display various flights instruments as selected by aircrew. The displays are generally hardwired to the aircraft systems that provide the data to be displayed.

Aircrew may use Portable Electronic Devices (PEDs) or Electronic Flight Bags (EFBs) when operating an aircraft. EFBs are an electronic display system intended primarily for use by flight deck or cabin crew members and include the hardware and software necessary to support an intended function, such as displaying a variety of aviation data or performing basic calculations (e.g., performance data, fuel calculations, etc.). EFB displays may use various technologies, formats, and forms of communication. Traditionally, the EFB receives power and data from the aircraft via a mounting device or connector that provides an electrical interface to the aircraft.

SUMMARY

Embodiments are directed to systems and methods for utilizing aircraft cockpit and cabin lighting to provide both power and data transmission to occupants. Data and power may be transmitted on non-visible and/or visible spectrums. The visible light may be used independently for aircraft illumination. Data for the cockpit allows for quick upload and download of flight planning and maintenance data to an electronic flight bag. The electronic flight bag may also be able to receive power from cockpit and cabin lighting during flight.

In one embodiment, an access point for providing light communication (LC) in an aircraft comprises an LC transmitter configured to broadcast light within a defined region on or in the aircraft, an LC receiver configured to receive light broadcast by a LC device on or in the aircraft, and an interface to an aircraft data network. The LC transmitter may be a Light Emitting Diode (LED), and the LC receiver may be a photodetector. The light communication may be established using a visible light spectrum, an invisible light spectrum, or both.

The access point may further comprise a processor for controlling the access point according to executable code, and a memory for storing data and executable code, wherein the executable code comprises instructions for causing the processor to establish light communication with the LC device. The processor may identify a current location of the LC device based upon communication with the LC access point. The processor may enable one or more selected applications on the LC device based upon the current location of the LC device. The processor may also disable one or more selected applications on the LC device based upon the current location of the LC device. The processor may establish a session with the LC device using light communication with the LC access point and may exchange session data with the LC device. The session and session data may be associated with one or more aircraft systems, such as an air data computer system, an attitude-heading reference system, a flight control computer, a navigation system, a communication system, and maintenance systems.

In another embodiment, a method comprises identifying a current location of an LC device in or near an aircraft based upon communication with an LC access point mounted on the aircraft and enabling one or more selected applications on the LC device based upon the current location. The method may further comprise disabling one or more selected applications on the LC device based upon the current location. The method may further comprise establishing a session between the LC device and an aircraft system and exchanging session data between the LC device and the aircraft system using light communication via the LC access point.

The LC device may be configured for use associated with aircraft operations, and the aircraft may have a plurality of separate LC-accessible zones, wherein identifying the current location of the LC device further comprises identifying a specific LC-accessible zone in which the LC device is located. Each LC-accessible zone may be supported by a different LC access point. Two or more LC-accessible zones may overlap at least in part. The method may further comprise tracking the LC device across a plurality of locations, wherein each of the plurality of locations are associated with a different LC access point. The method may further comprise generating an alert when the LC device is not authorized for operation in the current location and/or generating an alert when a current user of the LC device is not authorized in the current location.

BRIEF DESCRIPTION OF THE DRAWINGS

Figure 1:
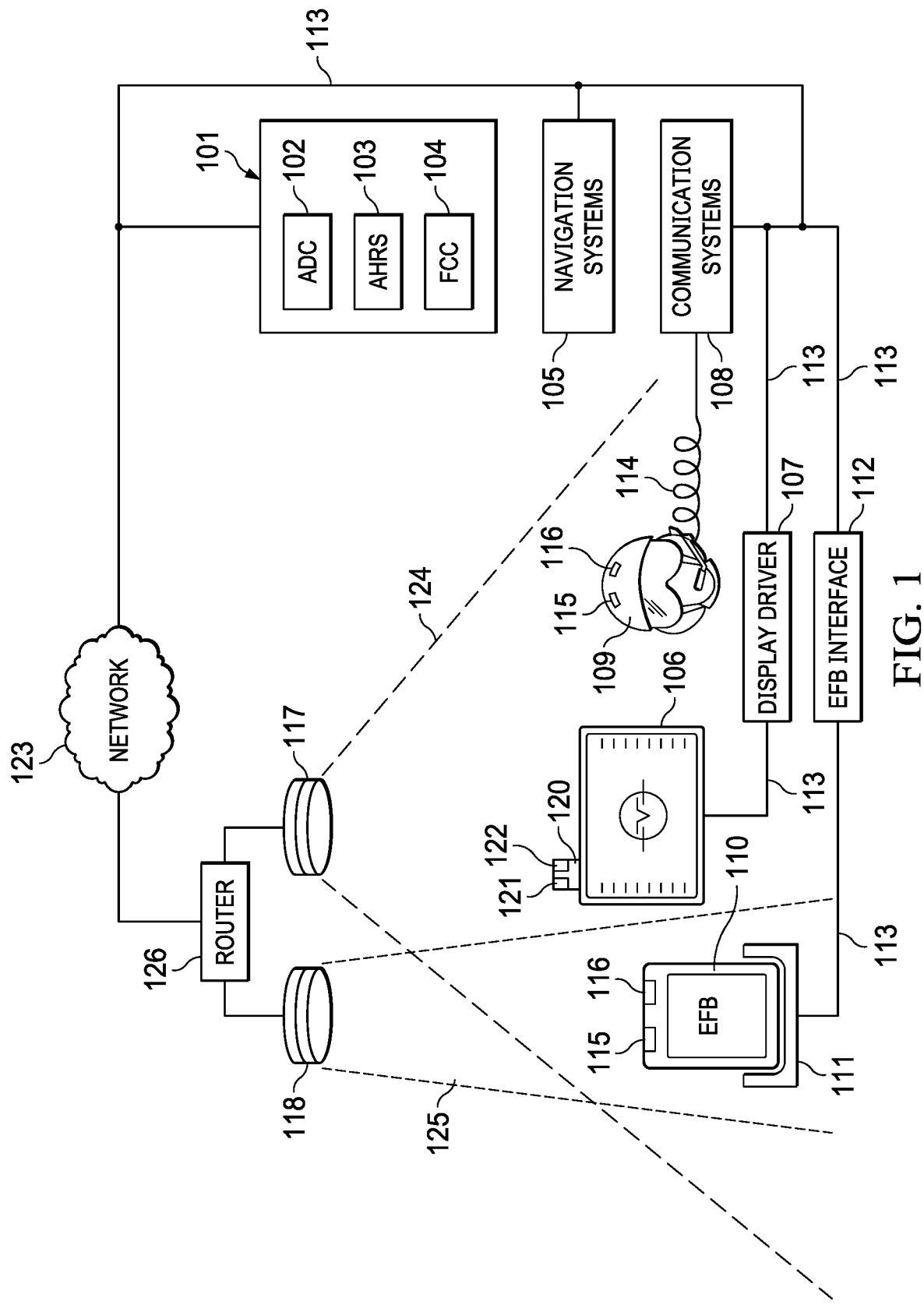

Having thus described the invention in general terms, reference will now be made to the accompanying drawings, which are not necessarily drawn to scale, and wherein:

FIG. 1 is a block diagram illustrating connections between various aircraft systems according to an example embodiment.

Figure 2:
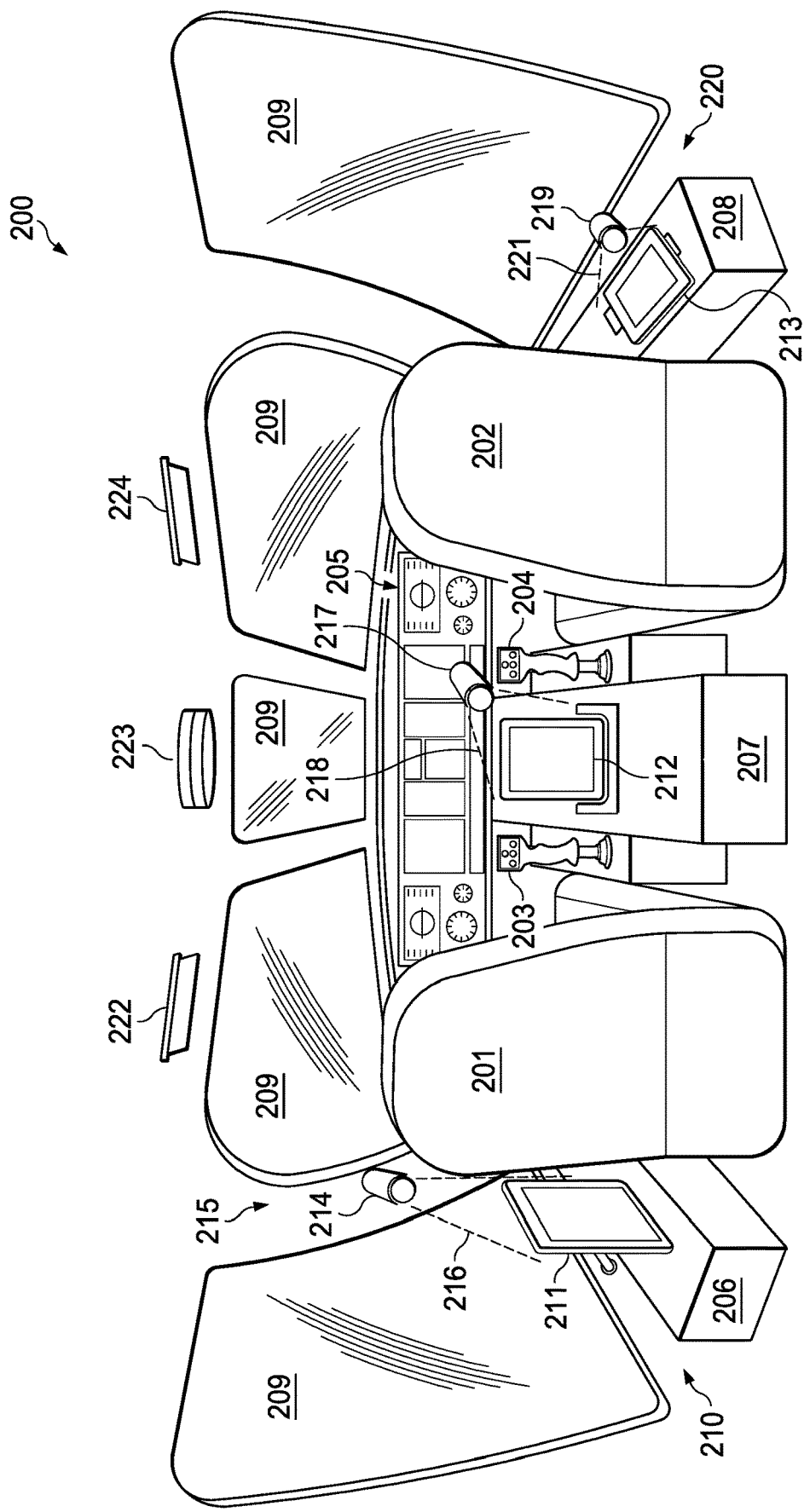

FIG. 2 depicts a cockpit configuration for an aircraft according to an example embodiment.

Figure 3:
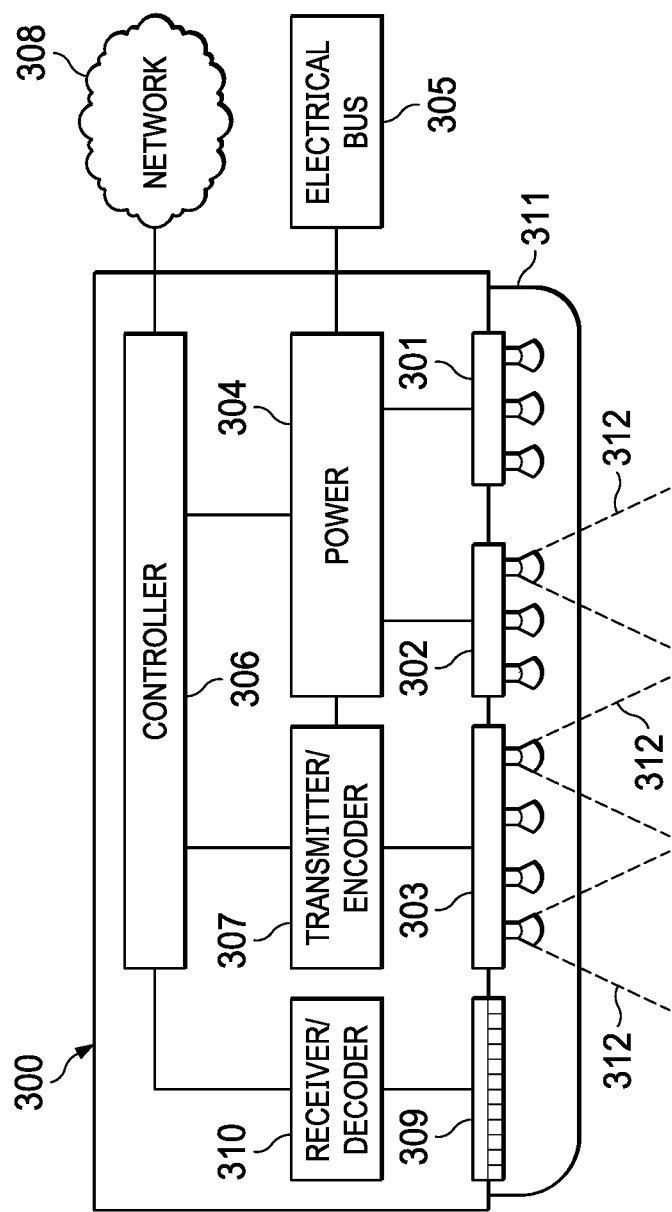

FIG. 3 depicts a light communication access point for use in an aircraft according to an example embodiment.

Figure 4:
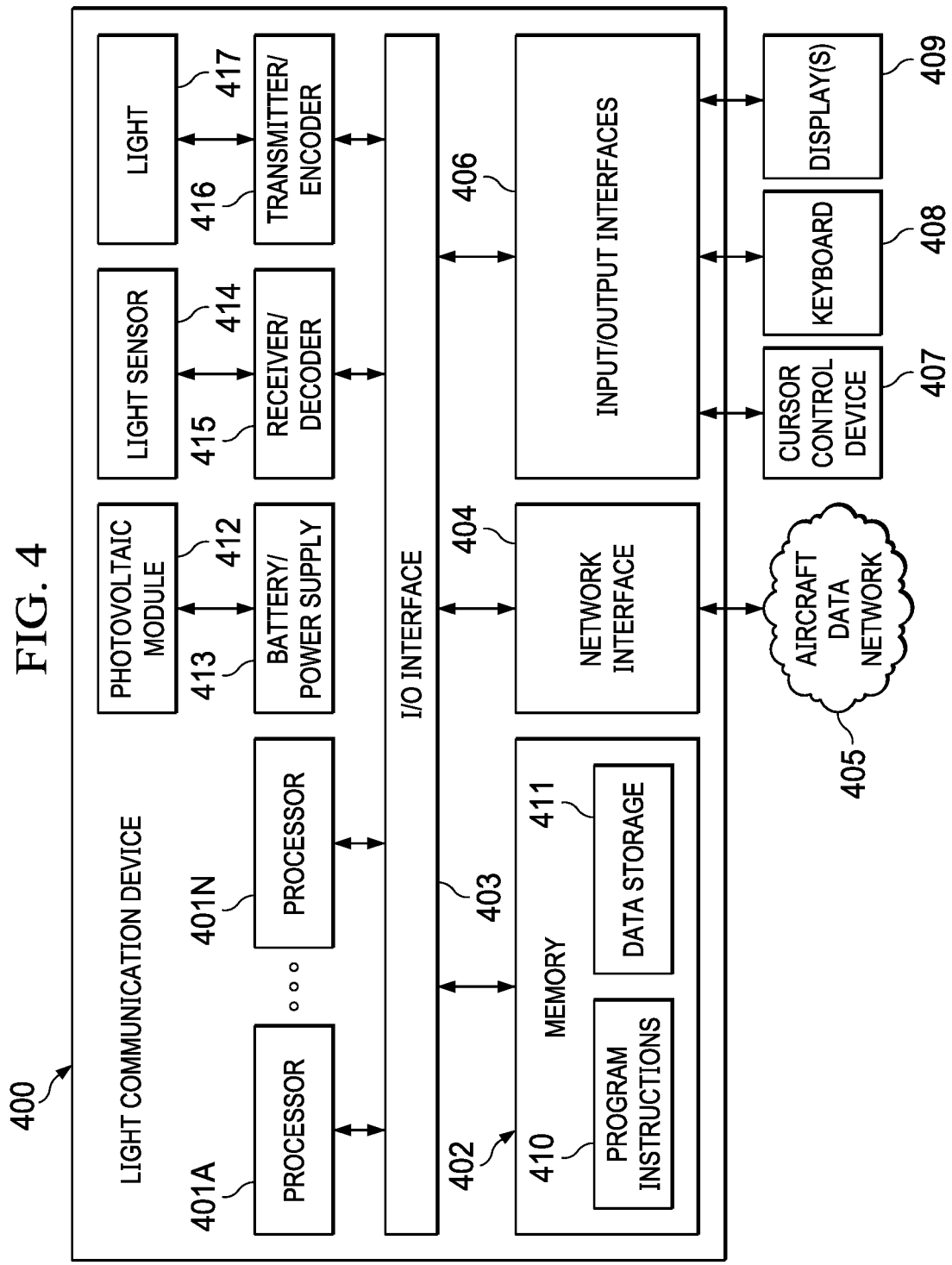

FIG. 4 is a block diagram illustrating a device capable of light communication according to an example embodiment.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

FIG. 1 is a block diagram illustrating connections between various aircraft systems according to an example embodiment. One group of systems 101 are used to monitor and control current aircraft flight conditions. Air Data Computer (ADC) system 102 receives inputs from the aircraft's pitot-static system and determines parameters such as true airspeed, pressure altitude, and Outside Air Temperature (OAT). Attitude-Heading Reference System (AHRS) 103 senses movement on three axes using gyroscopes and accelerometers to provide attitude information for the aircraft, such as aircraft attitude relative to the pitch, roll, and yaw axes. Flight Control Computer (FCC) 104 receives inputs from a pilot, such as the motion of a cyclic/collective, control stick/yoke, and/or pedals, and then positions aircraft flight control actuators to achieve a commanded configuration, such as a desired rotor blade position or a desired aileron/rudder/elevator deflection. FCC 104 may also receive inputs from an autopilot system and/or remote-control system in other embodiments. FCC 104 may also receive inputs from, and provide commands to, an aircraft engine or propulsion system.

Navigation systems 105 are used to locate the aircraft's current position and to assist the aircrew in navigating to a destination or waypoint. Navigation systems 105 may provide location data relative to nearby ground-based navigational aids (navaids) or may use satellite navigation systems that provide global coverage. Navigation systems 105 may include an inertial navigation system (INS) that uses accelerometers and gyroscopes to provide acceleration and angular velocity measurements that are used to calculate the relative position, orientation, and velocity of the aircraft.

One or more displays 106, such as an LCD or LED panel on an aircraft instrument panel, may be used to show images of flight instruments, aircraft data, icons, or any other information generated by ADC 102, AHRS 103, FCC 104, and navigation systems 105. Display 106 may function as a primary flight display and/or multi-function display. The display inputs may be formatted using a display driver 107, such as a graphics processing unit (GPU), a graphics card, or display driver software running on a processor in aircraft systems 101 or navigation systems 105, for example. Display 106 may also be used to present information regarding the status of various aircraft systems, such as electrical, hydraulic, fuel, lighting, landing gear, flight control, or other systems.

Aircraft communication systems 108 allow aircrew to communicate with other aircraft and ground stations using VHF/UHF/HF radios, data links, and satellite communications. Communication systems 108 also allow aircrew and passengers to communicate with others onboard the aircraft using a headset 109, such as a helmet having an integral microphone and speakers, for example. Communication systems 108 may also be coupled to display 106 through display driver 107 to provide information to the aircrew, such as a selected radio and/or communication channel.

Aircrews may use an Electronic Flight Bag (EFB) 110 that replaces some of the paper reference material that pilots typically carry in the cockpit. EFB 110 is an information system for flight deck crew members that allows storing, updating, delivering, displaying, and/or computing digital data to support flight operations or duties. EFB 110 may display aviation data (e.g., checklists, navigation charts, pilot's operating handbook (POH), flight instruments, maintenance data) or perform basic calculations (e.g., performance data, fuel calculations). EFB 110 may be portable, which allows it to be used outside the aircraft for preflight planning, for example. When used in the aircraft, EFB 110 is attached to a mount 111, which may provide power and/or data connections to other aircraft systems through an EFB interface 112.

Traditionally, connections between aircraft systems have used physical, hardwired connections, such as wire harnesses 113, or detachable cords, such as comm cord 114. Hardwired connections limit the ability to move aircraft systems since the equipment must be located at an appropriate hardwired connector for that equipment. Additionally, hardwired connections are subject to wear and tear over time and to installation errors, which can lead to failures due to poor connections, broke wires, electromagnetic interference, etc.

Certain aircraft equipment and systems, such as display 106, headset 109, and EFB 110, may use light communication (LC) to provide data and/or power connections to the aircraft. The LC-capable systems may have an embedded LC sensor 115 and LC transmitter 116 that are configured to communicate with LC access points 117, 118 onboard the aircraft. Alternatively, an external LC device 120 may connect directly to one or more device to support LC connections, such using as a dongle 120 that plugs into a USB or other port on display 106. The external LC communication device 120 has an LC sensor 121 and an LC transmitter 122. LC sensors 115, 121 (e.g., cameras or photodetectors) and LC transmitters 116, 122 (e.g., LED) need to be exposed to remote light sources and sensors in LC access points 117, 118.

Devices 106, 109, 110 may communicate with each other and with other aircraft systems, such as navigation systems 105 or communication systems 108, using an LC network 123.

In one embodiment, LC is supported using LC access points 117 and 118. Each LC access point 117, 118 services its own limited area or attocell 124, 125, respectively. A device 106, 109, 110 must have the appropriate LC capabilities (e.g., photodetector and light transmitter) and be within an attocell 124, 125 in order to communicate with one of LC access points 117, 118. Attocells 124, 125 have a specific coverage area that is limited by the region covered by light from each LC access point 117, 118. In the example embodiment depicted in FIG. 1, LC access point 117 broadcasts a diffuse light pattern that covers a broad area as illustrated by attocell 124, and LC access point 118 is a spotlight that creates narrow attocell 125, which is focused on EFB 110. Broad attocell 124 may provide LC coverage over a large area of the aircraft, such as an entire cockpit, cabin, station, or other open space. Narrow attocell 117 may be focused on particular locations, such as a specific seat, panel, console, or other tightly restricted location. Once communication is established with an LC access point 117, 118, devices 106, 109, 110 can communicate with each other and/or with remote equipment 102-105, 107, 108, 112 via router 126 and LC network 123, which provides a connection to the aircraft's wiring system. Router 126 may be coupled to additional LC access points (not shown) to provide additional attocells in the aircraft.

It will be understood that the term "access point" as used herein comprises any device or base station that transmits and/or receives data over wireless communication channels in visible and/or invisible light communication (which may include infrared and ultraviolet light communication) bands. The access point functions as a gateway or portal that allows wireless devices to connect to a wired and/or wireless network. The access point may communicate with one or more wireless devices.

Light sensor 115 may be, for example, a camera, image sensor, or photodetector, such as a Complementary Metal Oxide Semiconductor (CMOS) sensor or other electronic chip that converts photons to electrons for digital processing. Light sensor 115 detects light and generates an electronic signal for a receiver/decoder that extracts data bits that are carried by the light. The extracted bits may carry information that can be used by processors in the receiving equipment. Data can also be sent using LC by encoding data bits using a transmitter/encoder into a signal that drives light transmitter 116, which then broadcasts the information as light signals. Any information that can be exchanged over traditional RF data channels can also be exchanged over LC channels, such as digital bit streams, packet data, voice, video, text, or other content. Although the example wireless communication devices 106, 109, 110 depict a system having both transmit and receive capabilities for light communications, it will be understood that in other embodiments only LC transmit components (i.e., light transmitter 115) or only LC receive components (i.e., light sensor 116). Such single-direction LC systems may be used, for example, when the wireless communication device only needs to transmit or only needs to receive data via an LC channel.

Light transmitter 116 may be a LED, for example. Light transmitter 116 may use invisible (e.g., infrared) and/or visible light spectrum for high-speed data communication. The total size of the infrared and visible light spectrum is approximately 2600 times the size of the entire radio frequency spectrum. LEDs have been shown to enable data rates up to 5 Gbps with peak transmission speeds of 8 Gbps using with a single LED. Data rates higher than 100 Gbps are feasible with laser-based lighting. Accordingly, LC can vastly extend the available bandwidth for wireless communication devices. Communication protocols available for LC may be referred to as Light Fidelity (LiFi) or Optical Wireless Communication (OWC) and may be defined in IEEE 802.11bb, IEEE 802.15.7m, 802.15.13, or other standards.

Referring again to FIG. 1, EFB device 110 is located within both broad attocell 124 and narrow attocell 125 and, therefore, may communicate with LC access point 117 and/or 118. However, display 106 and headset 109 are located outside attocell 125, which prevents communication with LC access point 118. The ability to narrowly focus the coverage for attocell 118 allows the LC system to specifically target selected locations or devices.

The LC sensor and LC transmitter components on the same device may operate in the same or different frequency bands. For example, both may operate in a visible light band or an infrared light band, or one component may operate in a visible light band while the other component operates in the infrared light band. Sub frequencies of the visible light band and infrared light band may also be identified and assigned to different components to avoid interference and improve security.

FIG. 2 depicts a cockpit configuration 200 for an aircraft according to an example embodiment. The aircraft features two pilot stations 201, 202 with associated flight controls, such as cyclic control assemblies 203, collective control assemblies 204, and pedal assemblies (not shown). A complete set of flight controls is provided for both pilots although not shown in FIG. 2. An instrument panel 205 is provided in the cockpit 200, which may be a single-screen instrument panel, such as an LCD panel, that can be used to show images of flight instruments, aircraft data, icons, or any other information. The objects displayed on instrument panel 205 may be located at default positions or in user-selected positions. Additional consoles 206-208 on the left and right bulkheads and between pilot stations 201, 202 may provide additional control panels and instrument displays for aircraft equipment. Windshield panels 209 allow the pilots to see outside the aircraft.

As noted above, pilots and aircrew may use EFBs to assist with flight planning and mission operations. In the example embodiment depicted in FIG. 2, EFBs may be deployed in various locations in cockpit 200. EFB 211 is mounted on the left bulkhead 210 for use by the pilot in the left crew station 201. EFB 212 is mounted on center console 207 for use by either pilot. EFB 213 is mounted on the right console 208 for use by the pilot in the right crew station 202. EFBs 211-213 may be coupled to aircraft networks and/or power using a physical connection. Additionally, or alternatively, EFBs 211-213 may use light to communicate with aircraft systems. Light may also be used as a power source for EFBs 211-213.

EFBs 211-213 may be in communication with one or more LC access points that provide data connections to other aircraft systems and/or provide power. The LC access points may be positioned in various locations in cockpit 200 to provide either broad or narrow coverage regions or attocells. LC access point 214 is mounted on windshield railing 215 and broadcasts light within attocell 216, which covers EFB 211 and console 206. LC access point 217 is mounted on instrument panel 205 and broadcasts light within a narrowly focused attocell 218, which covers EFB 211 and at least a portion of console 207. LC access point 219 is mounted on bulkhead 220 and broadcasts light within a narrowly focused attocell 221, which covers EFB 211 and console 208.

Additional LC access points 222-224 provide broad LC coverage over a wide area. For example, LC access point 223 may provide coverage over the entire cockpit area, which would include EFBs 211-213, instrument panel 205, and any other LC-capable devices in cockpit 200. LC access points 222 and 224 may provide LC coverage limited to the region around pilot stations 201 and 202, respectively. This would allow, for example, LC access point 222 to provide coverage for the pilot sitting in seat 201 along with EFBs 211 and 212, and LC access point 224 to provide coverage for the pilot sitting in seat 202 along with EFBs 212 and 213.

Each LC access point may use the same or different frequencies for light communication. This provides control over which LC-capable device is able to communicate with which LC access point. Since the LC access points' service area is limited by the region or attocell covered by its transmitted light, LC-capable devices may be restricted to work only in certain locations within an aircraft based upon the coverage area of a particular LC access point. For example, LC access point 223 may provide a broad coverage region across the entire cockpit 200, which allows LC access point 223 to communicate with any LC-capable device that is located in cockpit 200. On the other hand, LC access point 214 covers only attocell 216 in the region around console 206, and LC access point 219 covers only attocell 221 around console 208.

LC access points 214 and 219 may operate using the same light frequencies, such as across an entire frequency band or within specified sub-bands, or each LC access point may operate using different frequencies. In some embodiments, the operating frequencies or frequency bands assigned to each LC access point may overlap. Similarly, EFBs 211 and 213 may operate across a broad range of light frequencies or may be limited to specific sub-bands or frequencies.

In an example use case, LC access points 214 and 219 are capable of operating in frequency bands that overlap at least in part, and EFBs 211 and 213 are capable of operating on frequencies within the bands assigned to both LC access points 214 and 219. This would allow EFBs 211 and 213 to be used in positions either on console 206 (i.e., within attocell 216) or on console 208 (i.e., within attocell 221). In this case, a pilot could use either EFB 211 or 213 in either crew station 201 or 202.

In second example use case, LC access point 214 is capable of operating only in a frequency band A, and LC access points 219 is capable of operating only in frequency band B. Also, EFB 211 is capable of operating only in frequency band A, and EFB 213 is capable of operating in frequency bands A and B. This configuration would limit EFB 211 to being used only on console 206 within attocell 216; however, EFB 213 could be used on either console 206 or 208 within either attocell 216 or 221. In this case, a particular pilot or crewmember may be limited to which crew station they can use if, for example, their EFB 211 is limited to working within a particular attocell 216; however, other crewmembers may use either station.

In third example use case, LC access point 214 is capable of operating only in a frequency band A, and LC access points 219 is capable of operating in frequency bands A and B. Also, EFB 211 is capable of operating only in frequency band A, and EFB 213 is capable of operating only in frequency band B. This configuration would allow EFB 211 to be used on either console 206 or 208 within either attocell 216 or 221; however, EFB 213 would be restricted to being used only on console 208 within attocell 221. In this case, a particular pilot or crew member may be limited to which crew station they can use if, for example, their EFB 213 is limited to working within a particular attocell 221; however, other crewmembers may use either station.

In fourth example use case, LC access point 214 is capable of operating only in a frequency band A, and LC access points 219 is capable of operating only in a frequency band B. Also, EFB 211 is capable of operating only in frequency band A, and EFB 213 is capable of operating only in frequency band B. This configuration would limit EFB 211 to be used on only console 206 within attocell 216 and limit EFB 213 to being used only on console 208 within attocell 221. In this case, each pilot or crew member may be limited to a specific crew station 201 or 202 because their EFB 213 is limited to working only with a particular attocell 219 or 221. Of course, pilots or crewmembers may use either station without relying on an EFB that is limited to a particular location.

In other embodiments, instead of using assigned LC access point frequencies to limit use of a particular device, an EFB may detect the light frequencies present and use that information to determine its location based upon the location of an associated LC access point. For example, if LC access points 214, 217, and 219 each operate in separate frequency bands A, B, and C, respectively, then depending upon which light frequencies are detected by an EFB, the probable location of the EFB can be determined. Accordingly, EFB 211 will detect light in frequency band A in this example and, therefore, can be determined to be within the attocell 216 coverage area or generally on or near console 206.

Since the coverage region for each LC access point is limited to the space that is covered by light broadcast from an LC access point (i.e., downlink) or space in which emitted light can be received at an LC access point (i.e., uplink). Accordingly, if EFB 211 is able to establish a connection with LC access point 214, then it follows that EFB 211 is within the attocell 216 coverage area or generally on or near console 206.

The ability to locate the position of an EFB or other LC-capable device within a particular attocell allows for the use of location-based and/or location-dependent services. For example, EFBs 211-213 may be located as being within attocells 216, 218, 221, respectively. The EFBs 211-213 may then be capable of certain functions based upon the detected location. For example, each EFB 211-213 may default to a particular service or application based upon location (i.e., based upon the associated LC access point 214, 217, 219 or attocell 216, 218, 221), such as displaying a particular checklist, map, navigation chart, mission information, aircraft information, engine information, flight instrument, maintenance data, etc. In other embodiments, rather than defaulting to a particular service or application, an EFB may be limited to a certain group of services or applications based upon location and/or attocell and/or LC access point. A crewmember may then use any from a list of available services or applications on the EFB, which are selected based upon a selected crew station 201, 202, for example. The list of available services or applications on the EFB may be further dependent upon or selected based upon flight or mission phase. For example, during takeoff each EFB might default to a preselected application (e.g., checklist, aircraft/ engine performance parameters, flight instrument, navigation chart, or the like) based upon the EFB's position in cockpit 200.

As used in the examples herein, it will be understood that the term frequency band is intended to mean a single frequency or a range of frequencies, wherein the frequencies corresponds to visible or invisible light. A range of frequencies may comprise a group of contiguous frequencies and/or a group of specific individual frequencies (e.g., channels). Furthermore, while the examples described herein may refer to EFB LC-capable devices, it will be understood that this is only to simplify the discussion and that any LC-capable device may be used, including, for example, headsets, helmets, night-vision goggles (NVG), displays, Portable Electronic Devices (PEDs), computers, laptops, tablets, and the like.

Moreover, although the examples refer to a cockpit environment 200, it will be understood that the systems and methods described herein for providing light communication may be applied to any internal or external section, portion, or compartment of an aircraft, including, for example, a passenger cabin, crew station, weapon station, galley, luggage compartment, cargo bay, lavatory, engine bay, avionics compartment, or the like. The use of aircraft-based light communication is not limited to aircrew or pilots, but also is available to passengers, gate agents, maintenance personnel, cleaning crews, and the like. For example, an aircraft maintenance technician with an LC-capable device, such as a tablet or PED, may receive relevant maintenance data on the device using light communication. If the technician is working on equipment in an avionics compartment, an LC access point in or near that compartment may provide equipment-specific information to the LC-capable device, such as operating parameters, maintenance checklists, diagnostics, fault codes, or installation instructions for the equipment.

FIG. 3 depicts a light communication access point 300 for use in an aircraft according to an example embodiment. A first set of one or more lights 301 provide visible light for cockpit or cabin lighting. A second set of one or more lights 302 provide visible or invisible light for use in powering LC-capable devices. A third set of one or more lights 303 are adapted for transmitting data using visible or invisible light communications. Power supply 304 receives power from an aircraft electrical bus 305, such as an avionics bus or accessory bus. Power supply 304 provides power to cockpit/cabin lights 301, such as LEDs, incandescent, or fluorescent bulbs, which may be selected on or off by a crewmember or passenger. Power supply 304 also provides electricity to power lights 302, which may be LEDs or laser lights, that transmit power wirelessly to other devices. Controller 306 may manage when such wireless power is available and at what frequencies. Power lights 302 may transmit power over the same frequency or groups of one or more lights 302 may transmit power on different visible and/or invisible frequencies.

Data is transmitted using LC by encoding data bits using transmitter/encoder 307 into a signal that drives data lights 303, which then broadcast the information as light signals. Data lights may be LEDs or laser lights, for example. Data lights 303 may transmit data over the same frequency or groups of one or more lights 303 may transmit data on different frequencies. Controller 306 is coupled to an aircraft data network 308, which carries information, such as digital bit streams, packet data, voice, video, text, or other content. Controller 306 receives information to be broadcast and sends the information to transmitter/encoder 307, which encodes the information as digital signals that are transmitted by data lights 303 in the visible and/or invisible spectrum.

A light sensor 309 detects visible and/or invisible light and generates an electronic signal for receiver/decoder 310, which extracts data bits that are carried by the light. The extracted bits may carry information that can be processed by controller 306 and forwarded to aircraft data network 308. Light sensor 309 may be, for example, a camera, image sensor, or photodetector, such as a CMOS sensor or other electronic chip that converts photons to electrons for digital processing.

LC access point 300 may include a clear or opaque cover 311 to protect lights 301-303. Each set of lights 301-303 and each individual bulb or LED therein may be configured to broadcast in a particular emission spectrum and pattern. The pattern may define a particular coverage region or attocell 312. The coverage regions 312 may or may not overlap.

In other embodiments only LC transmit components (i.e., transmitter/encoder 307 and light transmitter 303) or only LC receive components (i.e., light sensor 309 and receiver/decoder 310 are provided in LC access point 300. Such single-direction LC systems may be used, for example, when a remote LC communication device only needs to transmit or only needs to receive data via an LC channel. Similarly, in other embodiments, various combinations power lights 302 and passenger/crew lighting 301 may be of included or excluded in LC access point 300.

Embodiments of the present systems and methods for providing light communications, as described herein, may be implemented or executed, at least in part, by one or more computer systems. FIG. 4 is a block diagram depicting a light-capable communication device 400, such as an EFB, PED, display, headset, helmet, NVG device, or the like, according to an example embodiment. As illustrated, device 400 includes one or more processors 401A-N coupled to a system memory 402 via bus 403. Device 400 may further include a network interface 404 coupled to bus 403. Network interface 404 may provide a wired connection to an external aircraft network 405, which may provide communication connections to other aircraft systems and equipment. One or more input/output (I/O) controllers 406 are coupled to devices, such as a cursor control device 407 (e.g., a mouse, touchpad, or stylus), keyboard 408, display(s) 409, etc. Each of devices 407, 408, and 409 may be integral to device 400 or may be a separate component (i.e., peripheral) that is capable of communicating with I/O controller 406 via a wired connection (e.g., serial port, Universal Serial Bus port) or wireless connection (e.g., Wi-Fi, Bluetooth, Near Field Communications Link, etc.). Other devices, such as microphones, speakers, scanners, printers, etc., may also be coupled to I/O controller 406.

In various embodiments, light communication device 400 may be a single-processor system including one processor 401A, or a multi-processor system including two or more processors 401A-N (e.g., two, four, eight, or more processors). Processors 401 may be any processor capable of executing program instructions. For example, in various embodiments, processors 401A-N may be general-purpose or embedded processors implementing any of a variety of Instruction Set Architectures (ISAs), such as the x86, PowerPC®, ARM®, SPARC®, or MIPS® ISAs, or any other suitable ISA. In multi-processor systems, each of processors 401A-N may commonly, but not necessarily, implement the same ISA. Also, in some embodiments, at least one processor 401 may include a Graphics Processing Unit (GPU) or another dedicated graphics-rendering device.

System memory 402 may be configured to store program instructions and/or data accessible by processor 401. In various embodiments, system memory 402 may be implemented using any suitable memory technology, such as Static Random-Access Memory (SRAM), Synchronous Dynamic RAM (SDRAM), nonvolatile/Flash-type memory, or any other type of memory. As illustrated, program instructions and data implementing certain operations and modules such as those described herein may be stored within system memory 402 as program instructions 410 and data storage 411, respectively. In other embodiments, program instructions and/or data may be received, sent, or stored upon different types of computer-accessible media or on similar media separate from system memory 402.

A computer-accessible medium may include any tangible and/or non-transitory storage media or memory media such as electronic, magnetic, or optical media—e.g., disk or CD/DVD-ROM coupled to device 400 via bus 403. The terms "tangible" and "non-transitory," as used herein, are intended to describe a computer-readable storage medium (or "memory") excluding propagating electromagnetic signals but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, Random Access Memory (RAM). Program instructions and data stored on a tangible computer-accessible storage medium in non-transitory form may further be transmitted by transmission media or signals, such as electrical, electromagnetic, or digital signals, which may be conveyed via a communication medium such as a network and/or a wireless link.

System memory 402 may include program instructions 410 that are configured to implement certain embodiments described herein and data storage 411 comprising various data accessible by program instructions 410. Program instructions 410 may be implemented in various embodiments using any desired programming language, scripting language, or combination of programming languages and/or scripting languages (e.g., C, C++, C#, Java™ JavaScript™, Perl, etc.). Data storage 411 may include data that may be used in these embodiments (e.g., recorded communications, profiles for different modes of operations, etc.). In other embodiments, other or different software elements and data may be included.

In an embodiment, bus 403 may be configured to coordinate I/O traffic between processor 401, system memory 402, and any other devices in the system, including network interface 404 or other interfaces, such as I/O interfaces 406. In some embodiments, bus 403 may perform any necessary protocol, timing, or other data transformations to convert data signals from one component (e.g., system memory 402) into a format suitable for use by another component (e.g., processor 401). In some embodiments, bus 403 may include support for devices attached through various types of peripheral buses, such as a variant of the Peripheral Component Interconnect (PCI) bus standard or the Universal Serial Bus (USB) standard, for example. In some embodiments, the function of bus 403 may be split into two or more separate components, such as a northbridge chipset and a southbridge chipset, for example. In addition, in some embodiments some or all the functionality of bus 403, such as an interface to system memory 402, may be incorporated directly into processor(s) 401A-N.

Network interface 404 may be configured to allow data to be exchanged between device 400 and other devices attached to a network, such as other computer systems, or between nodes of device 400. In various embodiments, network interface 404 may support communication via wired or wireless general data networks, such as any suitable type of Ethernet network, for example, via telecommunications/telephony networks such as analog voice networks or digital fiber communications networks, via storage area networks such as Fibre Channel SANs, or via any other suitable type of network and/or protocol.

I/O interfaces 406 may, in some embodiments, enable communications with one or more display terminals, keyboards, keypads, touchpads, scanning devices, voice or optical recognition devices, mobile devices, or any other devices suitable for entering or retrieving data by one or more devices 400. Multiple I/O controllers 406 may be present in device 400 or may be distributed on various nodes of device 400. In some embodiments, I/O devices may be separate from device 400 and may interact with one or more nodes of device 400 through a wired or wireless connection, such as over network interface 404.

Light communication device 400 may be capable of receiving power that has been transmitted by visible or invisible light. Photovoltaic module 412 is configured to receive light, such as light broadcast by power lights 302 (FIG. 3), and to produce electricity. The electricity is then provided to a battery or power supply 413.

Light communication is supported using a light sensor 414 and a receiver/decoder 415 to receive data and a transmitter/encoder 416 and light transmitter 417 to transmit data. Light sensor 414 may be, for example, a camera, image sensor, or photodetector, such as a CMOS sensor or other electronic chip that converts photons to electrons for digital processing. Light sensor 414 detects light and generates an electronic signal for receiver/decoder 415, which extracts data bits that are carried by the light. The extracted bits may carry information that can be used by processors 401A-N. Data can also be sent using LC by encoding data bits using transmitter/encoder 416 into a signal that drives light transmitter 417, which then broadcasts the information as light signals. Light transmitter 417 may be an LED or laser, for example. Light sensor 414 and light transmitter 417 may use invisible (e.g., infrared or ultraviolet) and/or visible light spectrum for high-speed data communication.

Although the example device 400 depicts a system having both transmit and receive capabilities for light communications, it will be understood that in other embodiments only LC transmit components (i.e., transmitter/encoder 416 and light transmitter 417) or only LC receive components (i.e., light sensor 414 and receiver/decoder 415). Such single-direction LC systems may be used, for example, when the device 400 only needs to transmit or only needs to receive data via an LC channel.

In other embodiments, the light communication transmit and receive components (i.e., light sensor 414, receiver/decoder 415, transmitter/encoder 416, and light transmitter 417) may be external to device 400, such as a separate dongle or USB device that is attached using IO interface 406 or network interface 404 to make device light-communication capable.

Light communication device 400 may be embodied, for example, as an EFB, PED, helmet, headset, cellular telephone, mobile telephone, smartphone, cellular-enabled smartwatch, tablet computer, portable personal computer, laptop computer, cellular modem, or other device that supports wireless communication. Device 400 may be addressed and/or identified using, for example, Internet Protocol (IP) address, Media Access Control (MAC) address, or the like.

The various operations described herein may be implemented in software executed by processing circuitry, hardware, or a combination thereof. The order in which each operation of a given method is performed may be changed, and various operations may be added, reordered, combined, omitted, modified, etc. It is intended that embodiment(s) described herein do not embrace all such modifications and changes and, accordingly, the above description should be regarded in an illustrative rather than a restrictive sense.

A person of ordinary skill in the art will appreciate that device 400 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

It should be understood that the various operations described herein, particularly in connection with FIGS. 1-4, may be implemented in software executed by processing circuitry, hardware, or a combination thereof. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

In an example embodiment, an access point for providing light communication is provided in an aircraft. The access point may comprise a light communication transmitter that is configured to broadcast light within a defined region on or in the aircraft. The access point may further comprise a light communication receiver that is configured to receive light broadcast by a light communication device on or in the aircraft. The access point may comprise an interface to an aircraft network, such as a data network, electrical power network, or communication network. The light communication transmitter may be an LED, and the light communication receiver may be a photodetector. The light communication may be established using a visible light spectrum, an invisible light spectrum, or combination of visible and invisible light, including various sub-spectrums and/or channels within the visible and invisible light spectrum.

The access point may further comprise a processor for controlling the access point according to executable code, and memory for storing data and executable code, wherein the executable code comprises instructions for causing the processor to establish light communication with the light communication device. The executable code may further comprise instructions for causing the processor to identify a current location of the light communication device based upon communication with the light communication access point, such location may be determined, for example, based upon an attocell or known coverage region associated with the light communication access point. The executable code may further comprise instructions for causing the processor to enable one or more selected applications on the light device based upon the current location of the light communication device. For example, if the light communication device is within an attocell or known coverage region associated with the light communication access point, the access point may allow certain data or packets associated with the one or more selected applications to pass to and from an aircraft or other network or may send an activation code to the device for the one or more selected applications. The executable code may further comprise instructions for causing the processor to disable one or more selected applications on the light communication device based upon the current location of the device. For example, the access point may block transmission of certain data or packets associated with the one or more selected applications or may withhold an activation code for one or more selected applications, if the light communication device is within an attocell or known coverage region associated with the light communication access point. The executable code may further comprise instructions for causing the processor to establish a session between the light communication device and the light communication access point using light communication and to exchange session data with the light communication device. The session and session data may be associated with one or more aircraft systems, such as, for example, an air data computer system, an attitude-heading reference system, a flight control computer, a navigation system, a primary flight display, a multi-function display, a communication system, monitoring systems (e.g., for electrical, hydraulic, fuel, lighting, landing gear, flight control, or other aircraft system status), and onboard or remote maintenance systems.

In another embodiment, a method for communicating using light comprises identifying a current location of a light communication device in or near an aircraft based upon communication with a light communication access point mounted on the aircraft and enabling one or more selected applications on the LC device based upon the current location. The method may further comprise disabling one or more selected applications on the light device based upon the current location. The enabling or disabling of the one or more selected applications may be accomplished, for example, by transmitting, forwarding, passing, or blocking various data and/or packets associated with the one or more selected applications or by sending an activation/deactivation code or other permission/revocation of permission to the one or more selected applications. The method may further comprise establishing a session between the light communication device and an aircraft system and exchanging session data between the light communication device and the aircraft system using light communication via the light communication access point. The light communication device may be configured for use associated with aircraft operations, and wherein the aircraft has a plurality of separate light communication accessible zones, and wherein identifying the current location of the light communication device may further comprise identifying a specific light communication accessible zone in which the light communication device is located. Each of a plurality of light communication accessible zones may be supported by a different light communication access point. Two or more such light communication accessible zones may overlap at least in part.

The method may further comprise tracking the light communication device across a plurality of locations, wherein each of the plurality of locations are associated with a different light communication access point. The method may further comprise generating an alert when the light communication device is not authorized for operation in the current location or when a current user of the device is not authorized in the current location. Such alerts may be presented, displayed, broadcast, or otherwise transmitted to the device attempting communication in an authorized location, to a user attempting communication in an unauthorized location, to other light communication devices or users (e.g., authorized devices or users) on the aircraft, and/or to a remote monitoring or security system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A system for providing light communication (LC) for an aircraft, comprising:
   one or more LC transmitters, each LC transmitter configured to broadcast light of a particular frequency or frequency band within a respective defined region of an avionics or maintenance compartment of the aircraft to establish an attocell in the respective defined region of the avionics or maintenance compartment;
   a portable device comprising an LC receiver configured to receive light broadcast by at least one of the LC transmitters at one or more particular frequency or frequency bands; and
   an interface to an aircraft data network in electronic communication with aircraft systems monitoring and to the LC transmitters and therethrough to the portable device when the portable device is disposed in a particular defined region of the avionics or maintenance compartment.

2. The system of claim 1, wherein each LC transmitter is a Light Emitting Diode (LED).

3. The system of claim 1, wherein the LC receiver is a photodetector.

4. The system of claim 1, wherein the light communication is established using a visible light spectrum, an invisible light spectrum, or both.

5. The system of claim 1, further comprising:
   a processor for controlling each LC transmitter according to executable code; and
   memory for storing data and executable code, wherein the executable code comprises instructions for causing the processor to establish light communication with the LC receiver.

6. The system of claim 5, wherein the executable code further comprises instructions for causing the processor to:
   identify a current location of the LC receiver based upon communication with a respective LC transmitter.

7. The system of claim 6, wherein the executable code further comprises instructions for causing the processor to:
   enable one or more selected applications on the portable device based upon the current location of the portable device.

8. The system of claim 6, wherein the executable code further comprises instructions for causing the processor to:
   disable one or more selected applications on the portable device based upon the current location of the portable device.

9. The system of claim 5, wherein the executable code further comprises instructions for causing the processor to:
   establish a session with the portable device using light communication with a respective LC transmitter; and
   exchange session data with the portable device.

10. The system of claim 9, wherein the session and session data are associated with one or more aircraft systems.

11. The system of claim 1 wherein:
    a first LC transmitter is configured to broadcast light in a first particular frequency or frequency band to establish a first attocell in a first respective defined region of the avionics or maintenance compartment;
    a second LC transmitter is configured to broadcast light of a second particular frequency or second frequency band within a second respective defined region of the avionics or maintenance compartment to establish a second attocell in the second respective defined region of the avionics or maintenance compartment; and
    the portable device LC receiver is further configured to receive light broadcast by an LC transmitter at one of the first or second particular frequencies or one of the first or second frequency bands.

12. The system of claim 1 wherein:
    a first LC transmitter is configured to broadcast light in a first particular frequency or frequency band to establish a first attocell in a first respective defined region of the avionics or maintenance compartment;
    a second LC transmitter is configured to broadcast light of a second particular frequency or second frequency band within a second respective defined region of the avionics or maintenance compartment to establish a second attocell in the second respective defined region of the avionics or maintenance compartment; and
    the portable device LC receiver is further configured to receive light broadcast by an LC transmitter in each of the first and second particular frequencies or each of the first and second frequency bands.

13. The system of claim 1 wherein:
    a first LC transmitter is configured to broadcast light in a first frequency band to establish a first attocell in a first respective defined region of the avionics or maintenance compartment;
    a second LC transmitter is configured to broadcast light in a second frequency band that overlaps with the first frequency band within a second respective defined region of the avionics or maintenance compartment to establish a second attocell in the second respective defined region of the avionics or maintenance compartment; and
    the portable device LC receiver is further configured to receive light broadcast by an LC transmitter in one of the first frequency band, the second frequency band or the overlap of the first and the second frequency bands.

14. The system of claim 1 wherein:
    a first LC transmitter is configured to broadcast light in a first particular frequency or frequency band to establish a first attocell in a first respective defined region of the avionics or maintenance compartment, and the portable device is a computer tablet;
a second LC transmitter is configured to broadcast light of a second particular frequency or second frequency band within a second respective defined region of the avionics or maintenance compartment to establish a second attocell in the second respective defined region of the avionics or maintenance compartment;
the first portable device LC receiver is further configured to receive light broadcast by an LC transmitter at the first particular frequency or in the first frequency band; and
the system further comprises a second portable device comprising an LC receiver configured to receive light broadcast by an LC transmitter at the second particular frequency or in the second frequency band.

15. The system of claim 14, further comprising a third portable device comprising an LC receiver configured to receive light broadcast by an LC transmitter in each of the first and second particular frequencies and/or each of the first and second frequency bands.

16. The system of claim 1 wherein:
a first LC transmitter is configured to broadcast light in a first particular frequency or frequency band to establish a first attocell in a first respective defined region of the avionics or maintenance compartment, and the portable device is a computer tablet;
a second LC transmitter is configured to broadcast light of a second particular frequency or second frequency band within a second respective defined region of the avionics or maintenance compartment to establish a second attocell in the second respective defined region of the avionics or maintenance compartment;
the first portable device LC receiver is further configured to receive light broadcast by an LC transmitter at the first particular frequency or in the first frequency band; and
the system further comprising a second portable device comprising an LC receiver configured to receive light broadcast by an LC transmitter in each of the first and second particular frequencies and/or each of the first and second frequency bands.

17. The system of claim 16, further comprising a third portable device comprising an LC receiver configured to receive light broadcast by an LC transmitter at only the second particular frequency or in the second frequency band.

18. The system of claim 1 wherein:
a first LC transmitter is configured to broadcast light in a first particular frequency or frequency band to establish a first attocell in a first respective defined region of the avionics or maintenance compartment, and the portable device is a computer tablet;
a second LC transmitter is configured to broadcast light of the first particular frequency or frequency band and broadcast light of a second particular frequency or in a second frequency band within a second respective defined region of the avionics or maintenance compartment to establish a second attocell in the second respective defined region of the avionics or maintenance compartment;
the first portable device LC receiver is further configured to receive light broadcast by an LC transmitter at the first particular frequency or in the first frequency band; and
the system further comprises a second portable device comprising an LC receiver configured to receive light broadcast by an LC transmitter at the second particular frequency or in the second frequency band.

19. The system of claim 18, further comprising a third portable device comprising an LC receiver configured to receive light broadcast by an LC transmitter in each of the first and second particular frequencies and/or each of the first and second frequency bands.

20. A system for providing light communication (LC) for an aircraft, comprising:
one or more LC transmitters, each LC transmitter configured to broadcast light of a particular frequency or frequency band at, but not inside, a respective avionics or maintenance compartment of the aircraft to establish an attocell at, but not inside, the respective avionics or maintenance compartment;
a portable device comprising an LC receiver configured to receive light broadcast by at least one of the LC transmitters at one or more particular frequency or frequency bands; and
an interface to an aircraft data network in electronic communication with aircraft systems monitoring and to the LC transmitters and therethrough to the portable device when the portable device is disposed in a particular defined region at, but not inside, the avionics or maintenance compartment.

* * * * *